(12) United States Patent
Farley

(10) Patent No.: US 10,737,203 B2
(45) Date of Patent: Aug. 11, 2020

(54) SHOWER WATER FILTER ASSEMBLY

(71) Applicant: David K. Farley, Corona, CA (US)

(72) Inventor: David K. Farley, Corona, CA (US)

(*) Notice: Subject to any disclaimer, the term of this patent is extended or adjusted under 35 U.S.C. 154(b) by 162 days.

(21) Appl. No.: 15/825,525

(22) Filed: Nov. 29, 2017

(65) Prior Publication Data

US 2019/0160401 A1 May 30, 2019

(51) Int. Cl.
| | |
|---|---|
| *B01D 35/04* | (2006.01) |
| *B05B 1/18* | (2006.01) |
| *B01D 24/06* | (2006.01) |
| *B05B 15/40* | (2018.01) |
| *C02F 1/00* | (2006.01) |

(52) U.S. Cl.
CPC ............. *B01D 35/04* (2013.01); *B01D 24/06* (2013.01); *B05B 1/185* (2013.01); *B05B 15/40* (2018.02); *C02F 1/003* (2013.01); *C02F 2307/06* (2013.01)

(58) Field of Classification Search
CPC . B05B 1/18; B05B 1/185; B05B 15/40; C02F 1/003; C02F 2307/06; C02F 1/283; C02F 2201/006; B01D 24/06; B01D 35/04
USPC .............. 210/282, 446, 449, 460; 285/138.1
See application file for complete search history.

(56) References Cited

U.S. PATENT DOCUMENTS

| | | | | |
|---|---|---|---|---|
| 1,056,811 | A | * | 3/1913 | McElroy .................. B05B 1/14 239/567 |
| 2,582,388 | A | | 1/1952 | Mansfield |
| 5,008,011 | A | | 4/1991 | Underwood |
| 5,152,464 | A | | 10/1992 | Farley |
| D361,622 | S | | 8/1995 | Farley |
| D366,095 | S | | 1/1996 | Farley |
| 5,503,742 | A | | 4/1996 | Farley |
| D406,874 | S | | 3/1999 | Farley |
| D409,718 | S | | 5/1999 | Farley |
| 5,914,043 | A | | 6/1999 | Farley |
| 6,016,977 | A | | 1/2000 | Farley |
| 6,056,875 | A | | 5/2000 | Farley |
| 6,187,187 | B1 | | 2/2001 | Farley |
| D444,536 | S | | 7/2001 | Farley |
| 6,270,023 | B1 | | 8/2001 | Farley |

(Continued)

FOREIGN PATENT DOCUMENTS

| | | | |
|---|---|---|---|
| EP | 1106259 | | 8/2006 |
| JP | 01215391 A | * | 8/1989 |

OTHER PUBLICATIONS

Examination Report for Australian Patent Application No. 2018271304; dated Sep. 6, 2019.

*Primary Examiner* — Matthew O Savage
(74) *Attorney, Agent, or Firm* — Stetina Brunda Garred and Brucker; Mark B. Garred

(57) ABSTRACT

A compact shower water filter assembly for holding a water filter element therein. The water filter element is easily changeable by unscrewing two halves of a body forming the filter assembly. The body halves are easily gripped and turned, so as to be opened or closed. The upper half of the body is internally threaded to engage the shower arm, and may pivot about the shower arm. The bottom half of the water filter assembly may include a showerhead, converting the shower water filter assembly, into a filtered showerhead assembly. The shower water filter assembly may be easily and quickly adapted to be held on any shower arm, and to replace any existing shower water filter without taking up as much room as currently existing shower water filters.

7 Claims, 6 Drawing Sheets

(56) References Cited

U.S. PATENT DOCUMENTS

| | | |
|---|---|---|
| 6,325,930 B2 | 12/2001 | Farley |
| D462,108 S | 8/2002 | Farley |
| D463,844 S | 10/2002 | Farley |
| 6,537,455 B2 | 3/2003 | Farley |
| D483,438 S | 12/2003 | Farley |
| RE39,142 E | 6/2006 | Farley |
| 7,097,122 B1 | 8/2006 | Farley |
| 7,866,576 B1 | 1/2011 | Farley |
| D638,099 S | 5/2011 | Farley |
| D638,514 S | 5/2011 | Farley |
| D638,515 S | 5/2011 | Farley |
| D659,796 S | 5/2012 | Farley |
| D659,797 S | 5/2012 | Farley |
| D665,474 S | 8/2012 | Farley |
| D665,478 S | 8/2012 | Farley |
| D666,010 S | 8/2012 | Farley |
| D667,925 S | 9/2012 | Farley |
| D667,926 S | 9/2012 | Farley |
| 2001/0037970 A1* | 11/2001 | Farley ............... E03C 1/08 210/435 |
| 2003/0034405 A1* | 2/2003 | Hsieh ............... B05B 1/18 239/553 |
| 2007/0235381 A1 | 10/2007 | Tsai |
| 2012/0031511 A1 | 2/2012 | Farley |
| 2013/0319929 A1 | 12/2013 | Farley |
| 2017/0000993 A1 | 1/2017 | Lin et al. |

* cited by examiner

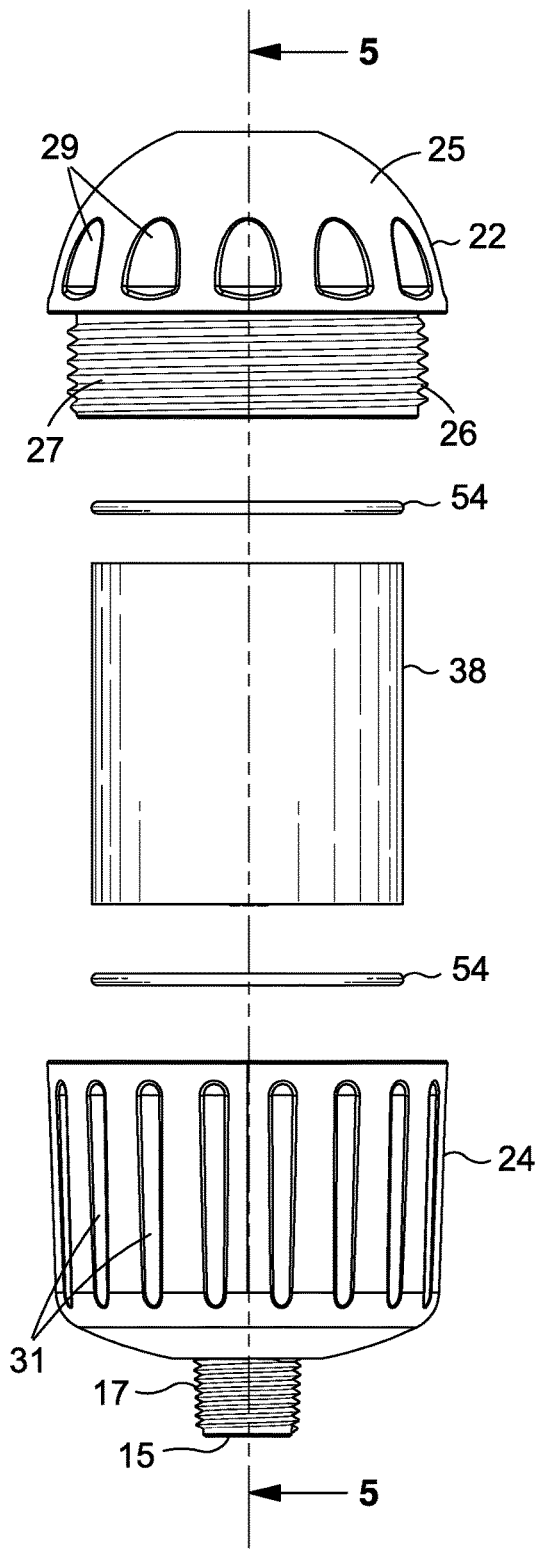
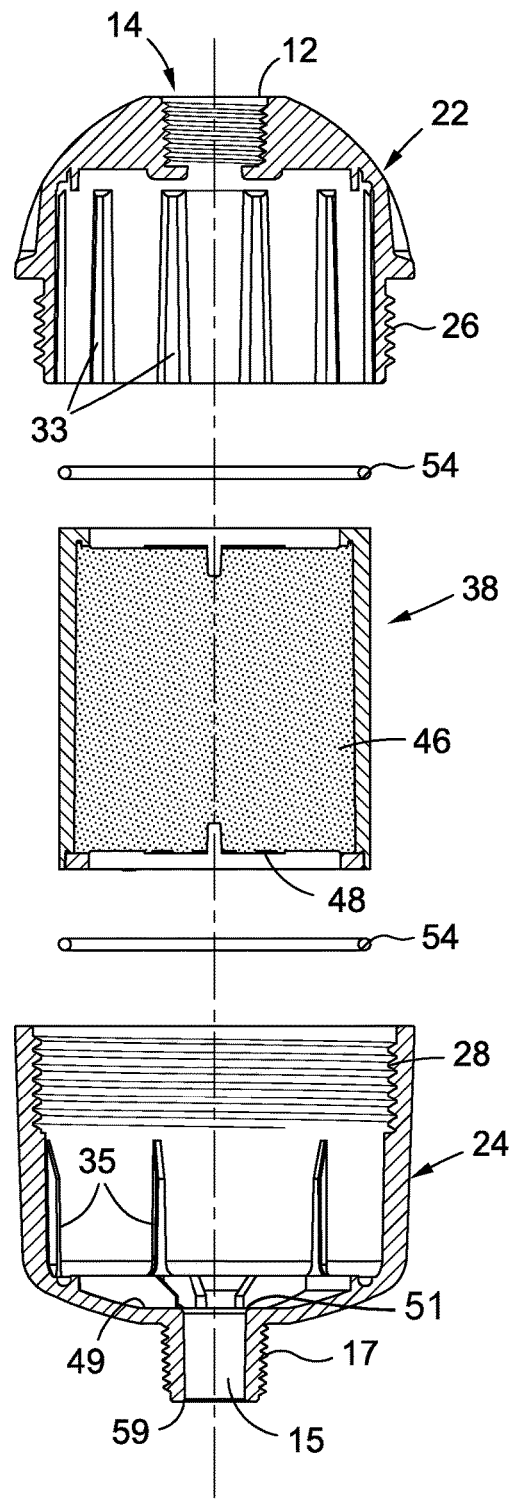
FIG. 4  FIG. 5

SHOWER WATER FILTER ASSEMBLY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

This invention relates generally to shower water filters and, more particularly, to an improved, compact shower water filter.

2. Description of Related Art

Shower water filters for use in conjunction with showerheads are known. These filters may be inserted into a water line, between the showerhead and the shower arm. However, because of the size of the filter and the added showerhead, this moves or offsets the showerhead so that it extends further into a shower area and, in some cases, interfering with a person taking a shower. Because of problems with size and the installation of such known shower filters, as well as the high cost of manufacturing, there exists the need in the art for a less-cumbersome, easy-to-install and move, low-cost shower water filter that is compact, and takes up a minimum of space.

Known shower water filter assemblies are set forth in U.S. Pat. No. 5,503,742 to Farley, U.S. Pat. No. 5,300,224 to Farley, and U.S. Pat. No. 5,152,464 to Farley. While the foregoing prior art devices provide improved filtration of water passing through them, they may extend the size of the joined showerhead and shower filter outwardly and/or downwardly beyond a preferred functional location for a particular shower.

Filtered showerheads are also available which include a water filter disposed within a showerhead, in a single assembly. One such filtered showerhead is described in U.S. Pat. No. 6,214,224 to Farley. While such filtered showerheads may provide a compact construction that accommodates a water filter as well as a showerhead assembly, there are certain limitations with respect to filtered showerheads. For example, filtered showerheads are offered with only a limited number of showerhead designs. Where a different showerhead design is preferred, a filtered showerhead may be unsuitable. Moreover, the filters used in filter showerheads may be of a less common shape, e.g., to fit within a specific showerhead, and therefore more expensive, and may need more frequent replacement than filters used in dedicated shower filters.

As such, there remains a need for a shower water filter, for use in conjunction with a separate showerhead, wherein the shower water filter takes up a minimum space. In that regard, it would be advantageous if the water filter body is directly engaged to the shower arm, to avoid the space penalty associated with an input collar assembly extending from the shower water filter body, and provide superior rigidity to the connection between the shower arm and the shower water filter body.

It would also be advantageous if the water filter could pivot about the shower arm, to provide greater versatility in the direction of water flow, and allow for directionality of water flow even where the showerhead itself does not include a dedicated pivot mechanism.

It would be further advantageous for the water filter could include easily interchangeable body parts, to vary the functionality of the water filter, e.g., allow the water filter to be readily converted into a filtered showerhead by simple replacement of an exterior body portion, such as the lower half body portion.

These and other objects and advantages are provided in accordance with the present invention, which is described further below in relation to the illustrated embodiments.

BRIEF SUMMARY

Accordingly, it is a general object of the present invention to provide an improved shower water filter assembly that provides a more-efficient and economical incorporation of a water filter into a single ergonomically designed body that is easily adaptable for different applications and shower conditions. It is a particular object of the present invention to provide a compact shower water filter assembly having a threaded internal passage for connecting to a shower arm, that takes up a minimum amount of space.

It is a further object of the present invention to provide a compact shower water filter assembly that can optionally pivot about the shower arm.

It is another object of the present invention to provide a shower water filter assembly that is easily disassembled to replace or remove the water filter held therein.

It is yet another object of the present invention to provide a shower water filter assembly that may be readily convertible to a filtered showerhead, by a replacement of a lower body portion of the shower water filter assembly, to an alternate lower body protion that incorporates a showerhead nozzle, preferably disposed within the lower body half.

BRIEF DESCRIPTION OF THE DRAWINGS

These and other features, objects and advantages of the present invention are implemented in the various embodiments set forth in the following description and drawings, in which like numbers refer to like parts throughout, and in which:

FIG. 4 is an exploded view of the invention;

FIG. 5 is an exploded sectional view of the invention;

DETAILED DESCRIPTION

The above description is given by way of example, and not limitation. Given the above disclosure, one skilled in the art could devise variations that are within the scope and spirit of the invention disclosed herein, including various ways of filtering water entering water within the filter body, connecting the body portions together, pivoting the body about the shower arm, or forming the optional shower nozzle within the filter body. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
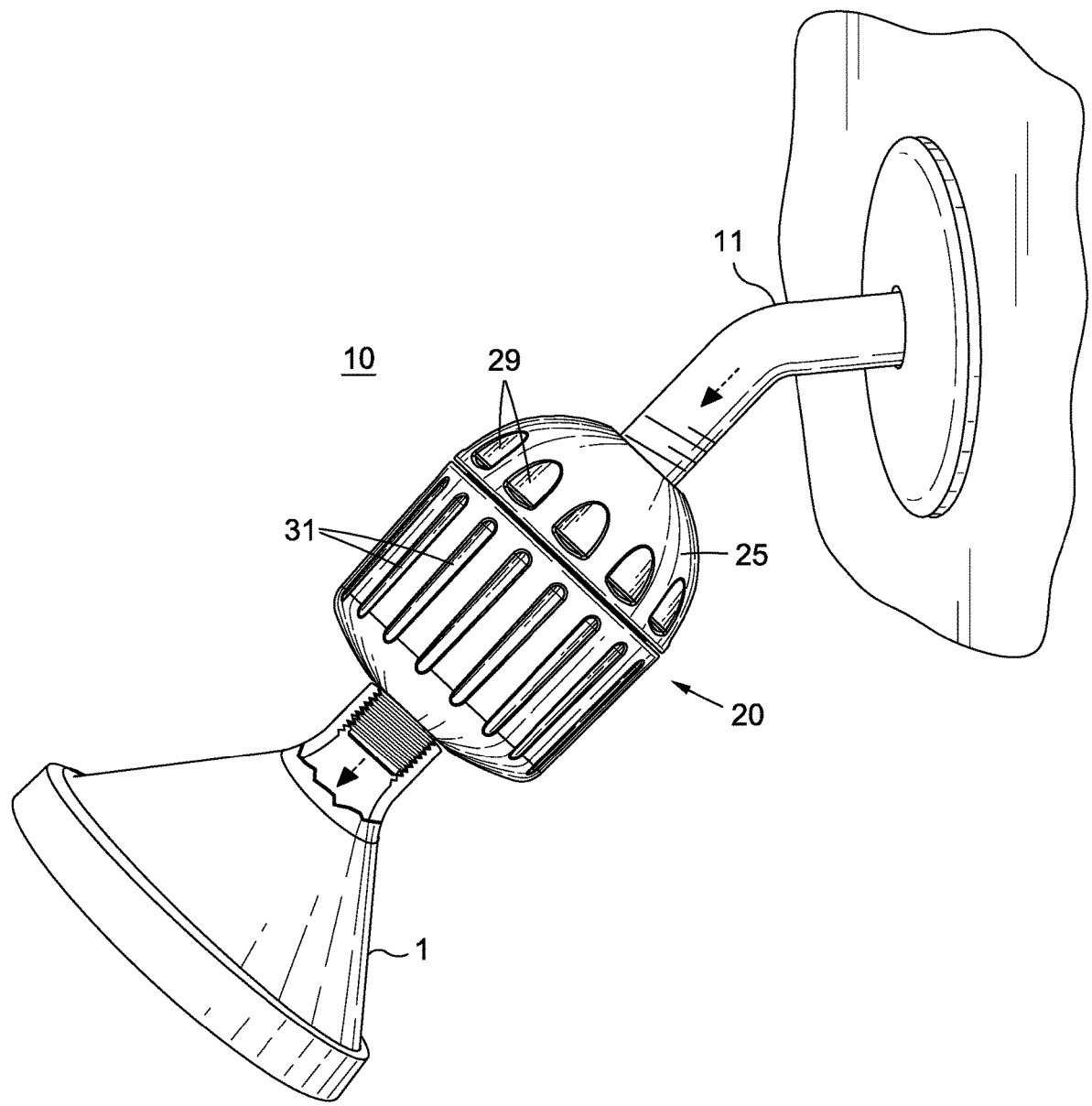
FIG. 1 is a perspective view of a preferred embodiment of a shower water filter assembly of the present invention as connected to a shower arm and an exemplary showerhead.
Figure 2:
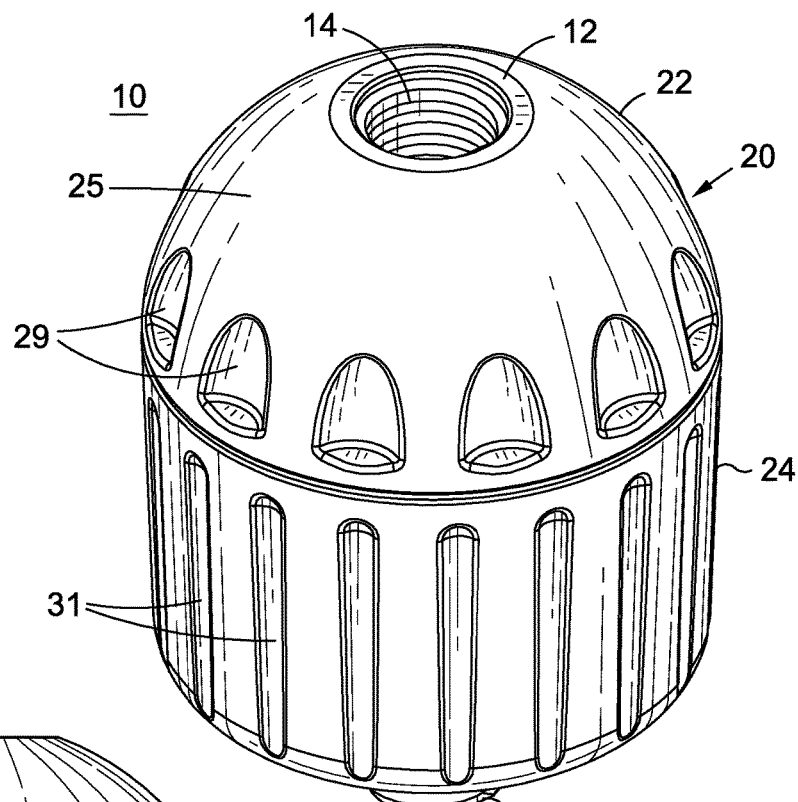
FIG. 2 is a top perspective view of the invention.
Figure 3:
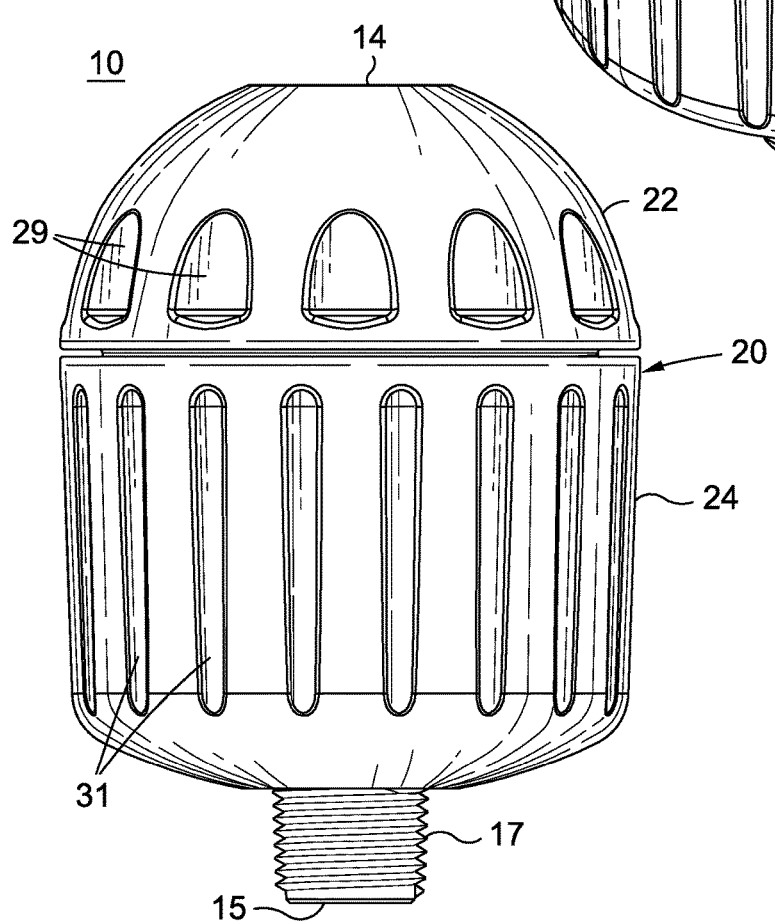
FIG. 3 is a front view of the invention.
Figure 6:
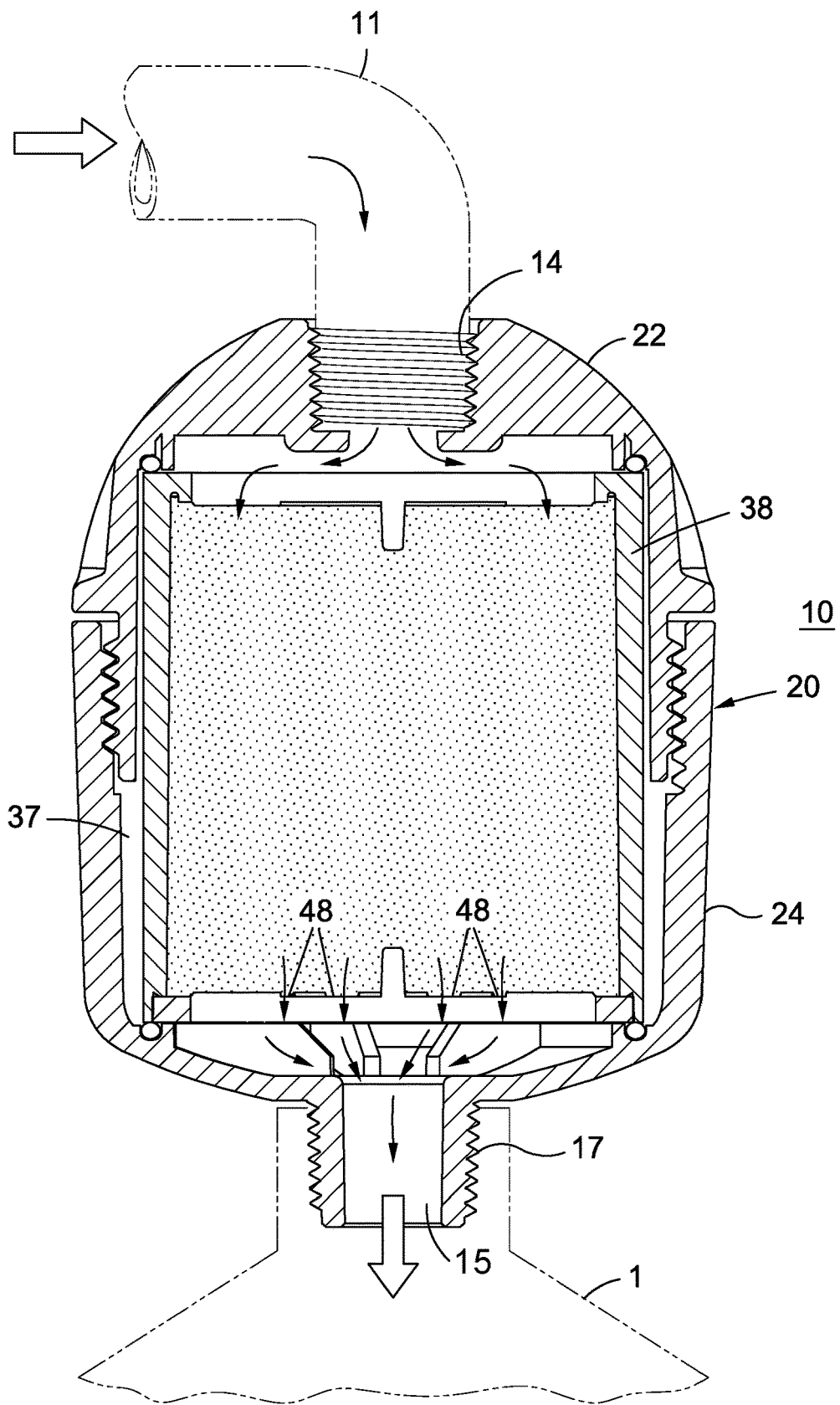
FIG. 6 is an enlarged sectional view of the invention.

Turning now to the drawings, FIGS. 1-3, illustrate one preferred embodiment of the compact shower water filter assembly 10 of the present invention. The shower water filter assembly 10 includes a body 20, which defines threadably engageable upper and lower body portions 22 and 24. The upper body portion 22 is engageable to the shower arm or water pipe 11 by means of a body input end 12 having a threaded input passage 14, shown at FIGS. 2 and 4-8. The input passage 14 is disposed within and may be formed integrally with upper body portion 22 of body 20, to provide greater rigidity to the connection between the shower arm 11 and the filter body 20. This is shown in more detail at FIGS. 6 and 8, where input passage 14 is shown to be formed as a portion of the upper body portion 22. Similarly, the lower body portion 24 may define an integral output passage 15, about which threads 17 may be formed to engage a separate showerhead. As shown in FIG. 4, the upper body portion 22 includes a dome-like, semispherical portion 25 which transitions to a connection portion 27 defining external threads 26. Formed in the semispherical portion 25 proximate the connection portion 27 is a circumferential array of equidistantly spaced grip recesses 29, each of which has a generally reverse elliptical profile. The internally threaded input passage 14 extends between the interior and exterior surfaces of the upper body portion 22 as defined by the semispherical portion 25 thereof. As further shown in FIG. 4, formed in the exterior surface of the lower body portion 24 is a circumferential array of equidistantly spaced, elongate grip channels 31. Each of the grip channels 31, which extend in generally parallel relation to the axis of the output passage 15, has one end which terminates just short of the distal rim of the lower body portion 24, and an opposite end which terminates just short of the bottom wall 49 of the lower body portion 24. As seen in FIG. 5, formed on the interior surface of the upper body portion 22 is a circumferential array of elongate, equidistantly spaced reinforcement ribs 33. Each of the ribs 33, which extend in generally parallel relation to the axis of the input passage 14, has one end which extends to the distal rim defined by the connection portion 27, and an opposite end which terminates just short of the interior surface of the upper body portion 22 as defined by the semispherical portion 25 thereof. As further seen in FIG. 5, formed on the interior surface of the lower body portion 24 is a circumferential array of elongate, equidistantly spaced reinforcement ribs 35. Each of the ribs 35, which extend in generally parallel relation to the axis of the output passage 15, has one end which terminates just short of the internal threads 28 of the lower body portion 24, and an opposite end which terminates just short of the bottom wall 49 of the lower body portion 24.

As a result of forming the threaded input passages integral with the associated body portion, the connection between the shower arm 11 and the water filter assembly 20 is made more rigid, more durable and more water tight.

Figure 7:
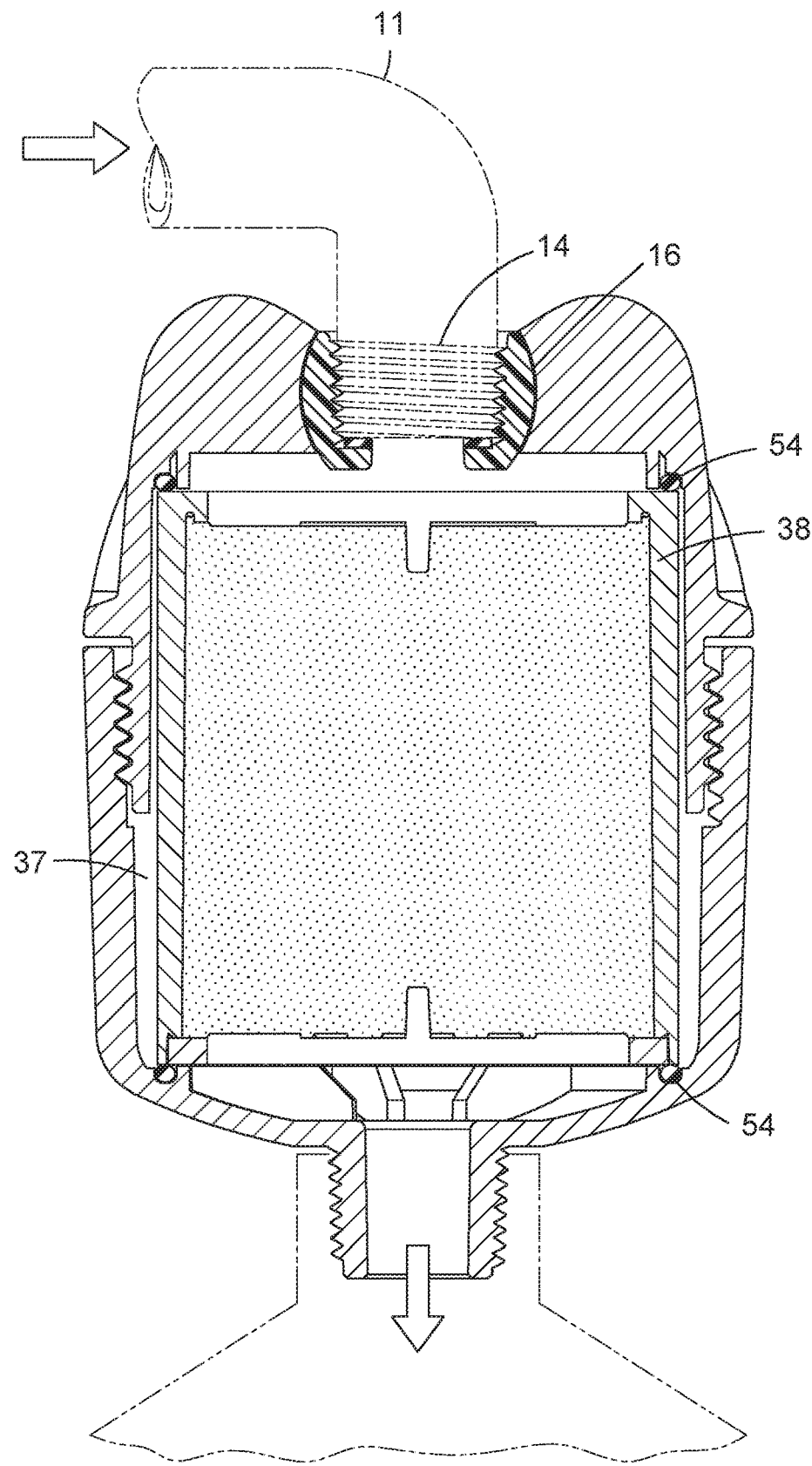
FIG. 7 is a sectional view of an alternate embodiment of the invention, including a pivotable water input.

In an alternate embodiment, as shown in FIG. 7, the water filter upper body portion 22 may be provided with a pivotable or rotatable element 16, which may be disposed within the body upper portion 22, to allow the body 20 to pivot about the shower arm 11, to provide greater directivity of the water filter, and the attached showerhead. The pivotable element 16 may be provided with internal threads to engage the shower arm within the upper portion 22 of body 20, to again minimize the extension of the water filter assembly from the shower arm.

As with the embodiments shown in FIGS. 1-6, the embodiment of FIG. 7 also includes a lower body portion 24, which is secured to the upper body portion 22 by internal threads 26, 28, defining mating end portions of the upper and lower body portions 22 and 24.

It should be understood that the upper and lower body portions 22, 24 may be formed in any desired shape, though they are preferably hollow and include cylindrical mating portions, as described above.

As shown at FIGS. 4-8, the shower water assembly 10 includes internal water filter 38, which is in fluid communication with the input passage 14 and the output passage 15. Sealing rings 54 are held against the upper and lower surfaces of filter 38 and wall portion 49 directs the water flow from the element 38 through the central opening 51 in the bottom wall 49 of lower body portion 24 and through output passage 15 and output end 59. As such, water entering the water filter assembly 10 passes through input passage 14, whereupon the water is directed through the filter body 38 and output passage 15, for communication to showerhead.

The filter media 46 is preferably a chlorine removing media, such as Chlorgon™ manufactured by Sprite Industries of Corona Calif. and is described in U.S. Pat. No. 5,914,043, issued Jun. 22, 1999. Water passes through the filter media 46 and out a plurality of exit openings 48 formed in a lower part of the annular housing of filter element 38. Exit openings 48 are preferably constructed as a wire mesh or screen to keep the filter media 46 within the annular housing.

The filter element 38 is securely held in the internal chamber formed by the mating body portions 22, 24, when they are screwed together by the internal and external threads 26, 28 on the outer ends of each of the halves. Sealing elements 54, such as O-ring seals, are held in annular grooves formed in the body portions 22, 24 to seal the filter element 38 within the internal chamber 37 of housing 20.

When the upper and lower body portions 22, 24 are assembled, as by being screwed together, the filter element 38 is held within the internal chamber 37 formed therebetween and cooperates with the internal chamber to direct water flow through filter media 46 held therein. The filter element 38 may be easily changed by unscrewing the top and bottom halves, removing the filter, and refilling the filter with new filter media, or replacing the entire filter. The filter media held within the filter 38 may be any desired filter media, but is preferably Chlorgon™, as described above, which removes chlorine and other unwanted materials from hot shower water.

Figure 8:
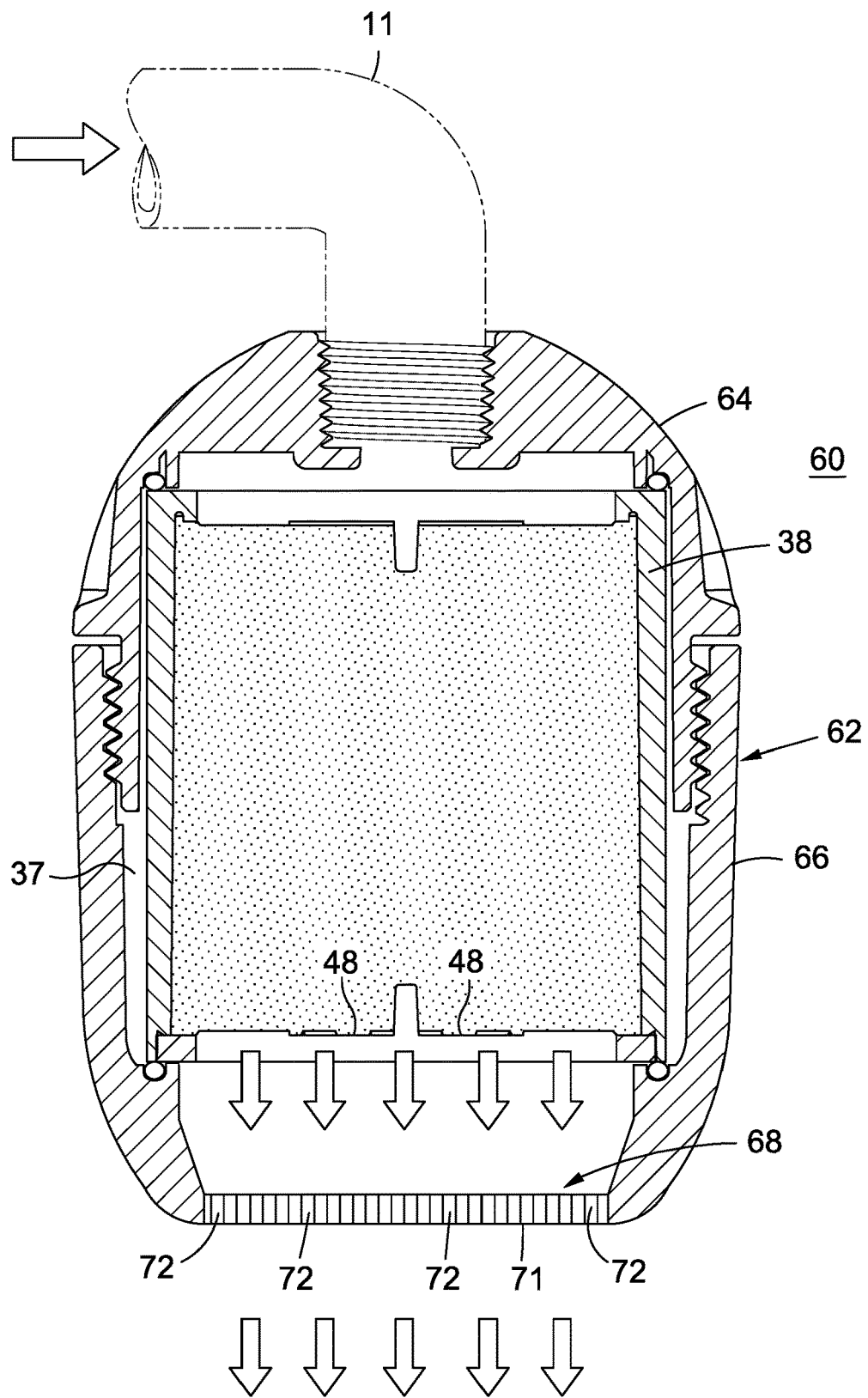
FIG. 8 is a sectional view of another embodiment of the invention, wherein the body lower portion includes a nozzle to provide a shower output from the body.

FIG. 8 illustrates a further embodiment of the invention wherein the invention is modified to form a filtered showerhead 60. In the illustrated embodiment the upper body portion 64 of the body 62 is form similar to upper body portion 22 of the body 20 illustrated in the preceding embodiments. However, the lower body portion 66 is formed differently than the lower body portion 24. More particularly, the lower body portion 66 is configured to receive shower nozzle 68, which is in fluid communication with the filter 38, to receive filtered water output from filter 38. Shower nozzle 68 may define a body lower portion bottom surface 71, which includes a plurality of nozzle outputs 72, through which the filtered water flows into a shower area.

As will be apparent to those skilled in the field, the specific construction of the shower nozzle 68, as well as the particular number and arrangement of nozzle outputs 72, may be varied without departing from the broader aspects of the invention. Moreover, it is anticipated that shower nozzle 68 could be permanently engaged to and be an integral portion of the lower body portion 66, or may be a separate element that may be engaged to the lower body portion 66 at the time of purchase, or thereafter. Where the shower nozzle 68 is configured as a separate element that is installable and removable after purchase, the consumer has a greater flexibility to select a preferred nozzle, and the preferred nozzle output pattern. Such construction is configured to also facilitate non-destructive removal and replacement of nozzles that may have become clogged, discolored or broken at some point during use, without the need to replace any of the remaining portions of the filtered showerhead 60.

The lower portion 66 of body 62 is preferably threadably engaged to the upper half 64 of body 62 in the same manner in which the upper and lower boy portions 22, 24 of body 20 are engaged. As such, the lower portion 24 of body 20 may be disengaged and replaced with lower portion 66 of body 60, to readily convert the water filter assembly 10 into the filtered showerhead 60.

All of the elements of showerhead filter assembly of the present invention may be fabricated in any desired manner, using any acceptable material, such as by molding plastic materials to form the various elements. Each of the elements is sized and dimensioned so that it is of minimum size, but is still capable of being secured to other elements and to a shower arm, as by means of the threaded end 12, so as to accommodate a water filter of sufficient size to filter out unwanted contaminants from hot shower water, without taking up more space than available showerheads having no filters therein.

Accordingly, as will be apparent to those skilled in the art, the present invention provides considerable advantages in ease and flexibility of manufacture of showerheads water filters. Additionally, the shower water filter of the present invention is easy to use and install, and takes up less space than known showerheads water filters. The upper and lower body portions are easily taken apart, for installation and removal of the filter element contained therein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A shower water filter assembly connectable to a shower arm, comprising:
    a substantially cylindrical body comprising:
        a generally dome-shaped upper body portion defining an interior surface, an exterior surface having a generally semispherical region, and an internally threaded input passage formed therein and extending between interior surface and semispherical region of the exterior surface while, the input passage not protruding from the semispherical region of the exterior surface and being adapted to threadedly engage and fluidly communicate with the shower arm;
        a lower body portion removably attached to the upper body portion and defining an interior surface, an exterior surface, and an externally threaded output passage adapted to threadedly engage and fluidly communicate with a shower head, the upper and lower body portions collectively defining a hollow internal chamber when attached to each other;
    a water filter held in the internal chamber and oriented such that water entering the internal chamber via the inlet passage is channeled through the water filter prior to existing the internal chamber via the output passage.

2. The shower water filter assembly as recited in claim 1 wherein the upper and lower body portions are threadedly connected to each other.

3. The shower water filter assembly as recited in claim 1 wherein the upper body portion includes a circumferential array of equidistantly spaced grip recesses formed in the semispherical region of the exterior surface thereof proximate a junction between the upper and lower body portions.

4. The shower water filter assembly as recited in claim 3 wherein each of the grip recesses has a generally reverse elliptical profile.

5. The shower water filter assembly of claim 1 further comprising a circumferential array of elongate, equidistantly spaced reinforcement ribs formed on the interior surface of the upper body portion and each extending in generally parallel relation to an axis defined by the input passage.

6. The shower water filter assembly of claim 1 further comprising a circumferential array of elongate, equidistantly spaced grip channels formed on the exterior surface of the lower body portion and each extending in generally parallel relation to an axis defined by the output passage.

7. The shower water filter assembly of claim 1 further comprising a circumferential array of elongate, equidistantly spaced reinforcement ribs formed on the interior surface of the lower body portion and each extending in generally parallel relation to an axis defined by the output passage.

* * * * *